United States Patent
Wicaksono et al.

(10) Patent No.: US 10,896,103 B2
(45) Date of Patent: Jan. 19, 2021

(54) INFORMATION PROCESSING SYSTEM

(71) Applicant: Hitachi, Ltd., Tokyo (JP)

(72) Inventors: Arif Herusetyo Wicaksono, Tokyo (JP); Kazuhide Aikoh, Tokyo (JP)

(73) Assignee: HITACHI, LTD., Tokyo (JP)

( * ) Notice: Subject to any disclaimer, the term of this patent is extended or adjusted under 35 U.S.C. 154(b) by 178 days.

(21) Appl. No.: 16/086,302

(22) PCT Filed: Sep. 5, 2016

(86) PCT No.: PCT/JP2016/004044
§ 371 (c)(1),
(2) Date: Sep. 18, 2018

(87) PCT Pub. No.: WO2018/042469
PCT Pub. Date: Mar. 8, 2018

(65) Prior Publication Data
US 2019/0073281 A1  Mar. 7, 2019

(51) Int. Cl.
| | | |
|---|---|---|
| *G06F 11/00* | (2006.01) | |
| *G06F 11/20* | (2006.01) | |
| *G06F 16/27* | (2019.01) | |
| *G06F 16/23* | (2019.01) | |

(52) U.S. Cl.
CPC .......... *G06F 11/2023* (2013.01); *G06F 11/00* (2013.01); *G06F 11/20* (2013.01); *G06F 16/2365* (2019.01); *G06F 16/27* (2019.01); *G06F 2201/80* (2013.01); *G06F 2201/805* (2013.01); *G06F 2201/82* (2013.01)

(58) Field of Classification Search
CPC ............... G06F 11/0709; G06F 11/142; G06F 11/1423; G06F 11/1425; G06F 11/20; G06F 11/2005; G06F 11/2007; G06F 11/202; G06F 11/2023; G06F 11/2092; G06F 11/16
USPC .......................................................... 714/4.1
See application file for complete search history.

(56) References Cited

U.S. PATENT DOCUMENTS

| | | | |
|---|---|---|---|
| 10,296,264 B2* | 5/2019 | Hassani ................. | G06F 3/0616 |
| 2012/0198171 A1* | 8/2012 | Chachad ............... | G06F 9/3012 711/128 |
| 2013/0117223 A1* | 5/2013 | Niki ....................... | G06F 16/185 707/610 |
| 2013/0139085 A1* | 5/2013 | Ichino .................. | G06F 3/04892 715/767 |

(Continued)

*Primary Examiner* — Sarai E Butler
(74) *Attorney, Agent, or Firm* — Procopio, Cory, Hargreaves & Savitch LLP

(57) ABSTRACT

A first system receives values with identifiers of the values from one or more clients. The first system enters the values sequentially into a first data store. The first system associates each of the values with a sequence ID indicating a position in entry sequence of the values into the first data store. The first system transmits a first identifier of a first value and a first sequence ID associated with the first value to a second system. The first system transmits the first sequence ID and the first value to the second system after transmitting the first identifier and the first sequence ID. The second system holds the first identifier and the first sequence ID transmitted from the first system in a first queue. The second system enters the first value received after the first identifier from the first system into a second data store.

14 Claims, 12 Drawing Sheets

(56) References Cited

U.S. PATENT DOCUMENTS

| | | | |
|---|---|---|---|
| 2015/0063350 A1* | 3/2015 | Sundaram | G06F 11/3636 370/389 |
| 2016/0170820 A1* | 6/2016 | Strong | G06F 9/30 714/37 |
| 2017/0053120 A1* | 2/2017 | Kamble | H04L 63/10 |
| 2017/0090760 A1* | 3/2017 | Kalipatnapu | G06F 3/0653 |

* cited by examiner

[Fig. 1]
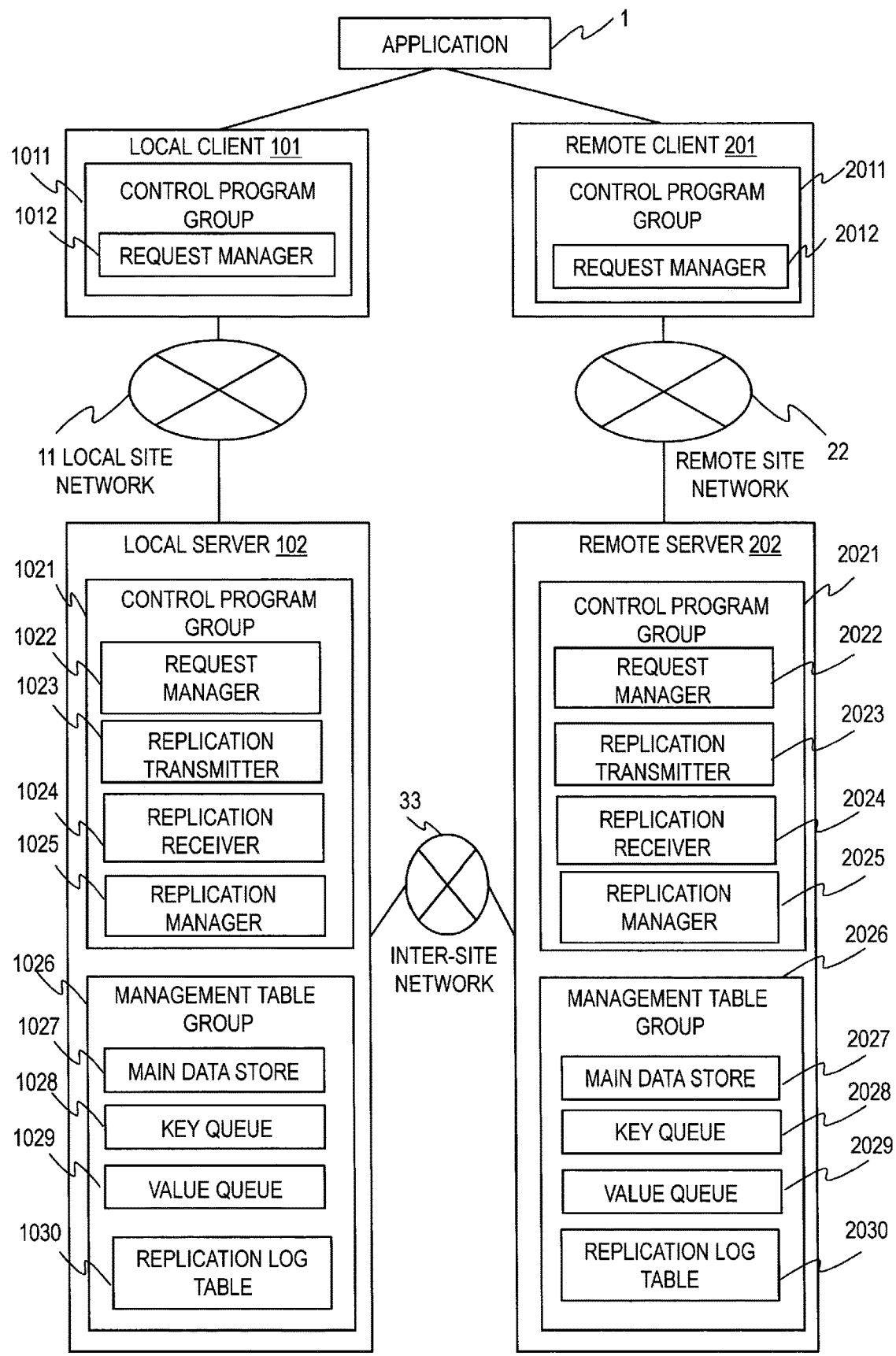

[Fig. 2]
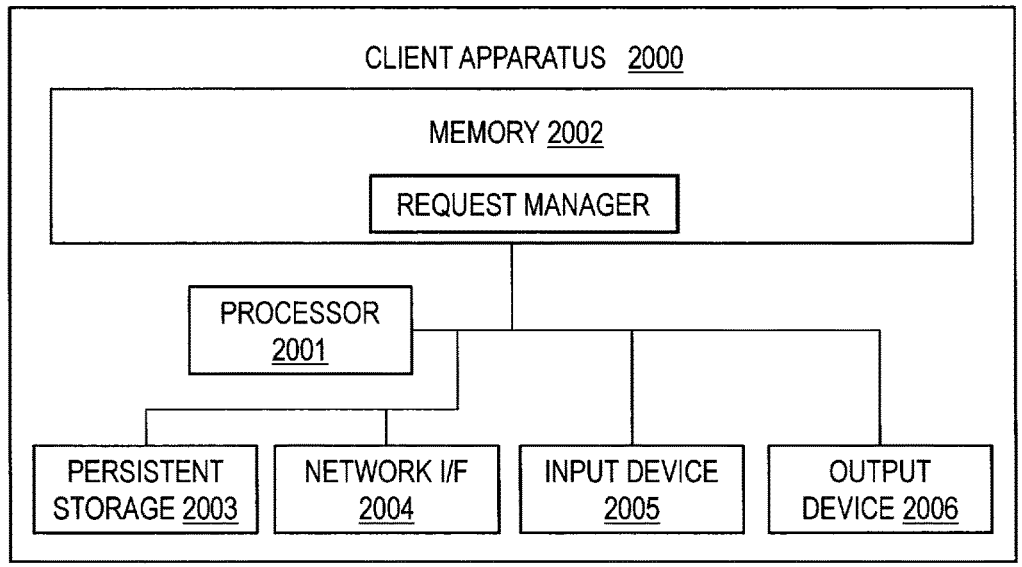
[Fig. 3]
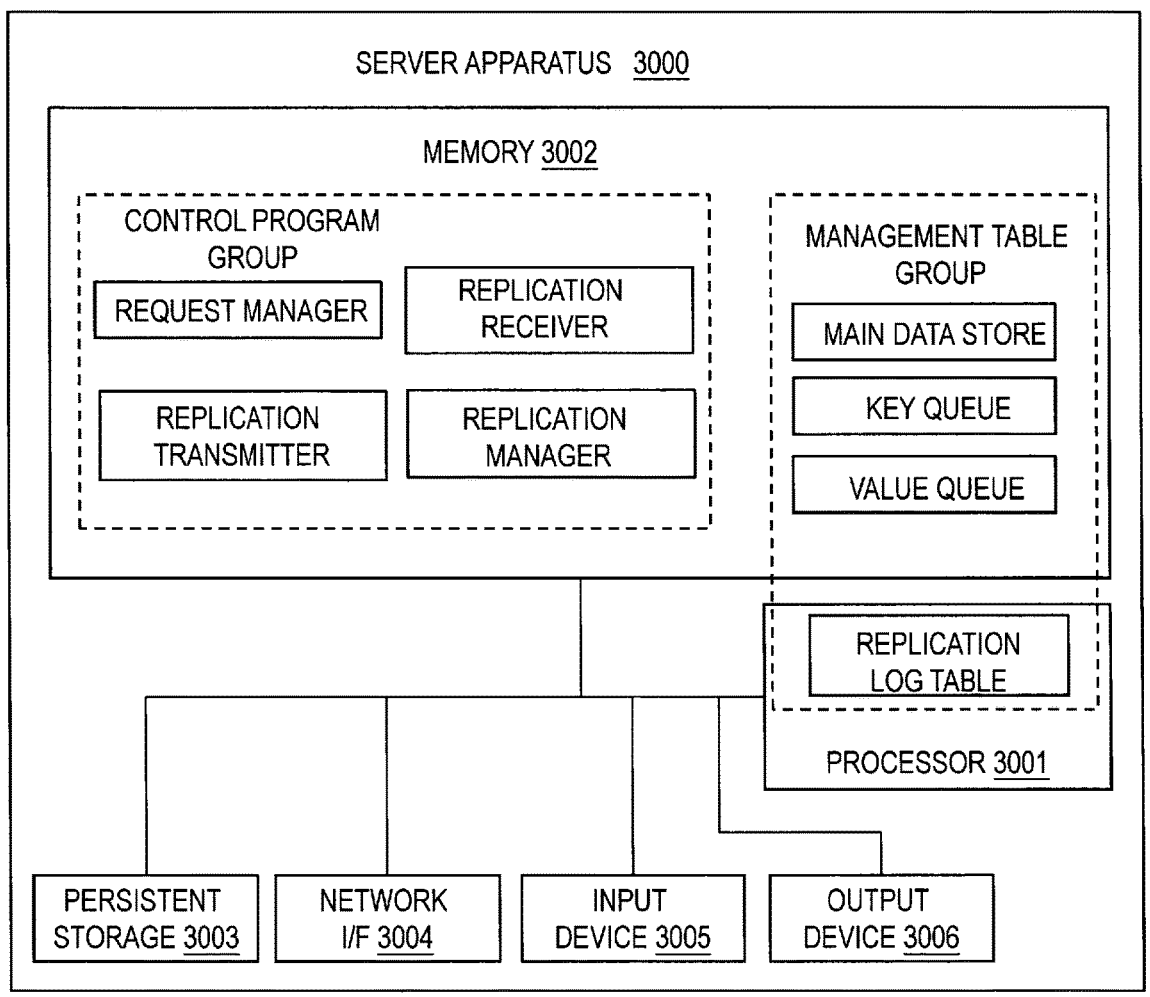

[Fig. 4A]

| SEQUENCE NUMBER | KEY |
|---|---|
| SEQ1 | KEY12 |
| SEQ2 | KEY11 |
| SEQ3 | KEY11 |
| SEQ4 | KEY13 |
| ⋮ | ⋮ |

KEY QUEUE  1028/2028

[Fig. 4B]

| SEQUENCE NUMBER | VALUE |
|---|---|
| SEQ1 | VALUE 120 |
| SEQ2 | VALUE 110 |
| SEQ3 | VALUE 111 |
| SEQ4 | VALUE 130 |
| ⋮ | ⋮ |

VALUE QUEUE  1029/2029

[Fig. 4C]

| KEY | VALUE |
|---|---|
| KEY11 | VALUE 111 |
| KEY12 | VALUE 120 |
| KEY13 | VALUE 130 |
| ⋮ | ⋮ |

MAIN DATA STORE  1027/2027

[Fig. 5]
| SEQUENCE NUMBER | KEY | PREVIOUS VALUE | NEW VALUE | REPLICATION FINISH STATUS |
|---|---|---|---|---|
| SEQ1 | KEY12 | NULL | VALUE 120 | TRUE |
| SEQ2 | KEY11 | NULL | VALUE110 | TRUE |
| SEQ3 | KEY11 | VALUE110 | VALUE111 | FALSE |
| SEQ4 | KEY13 | NULL | VALUE130 | FALSE |
| ⋮ | ⋮ | ⋮ | ⋮ | ⋮ |
REPLICATION LOG TABLE  1030/2030
[Fig. 6]
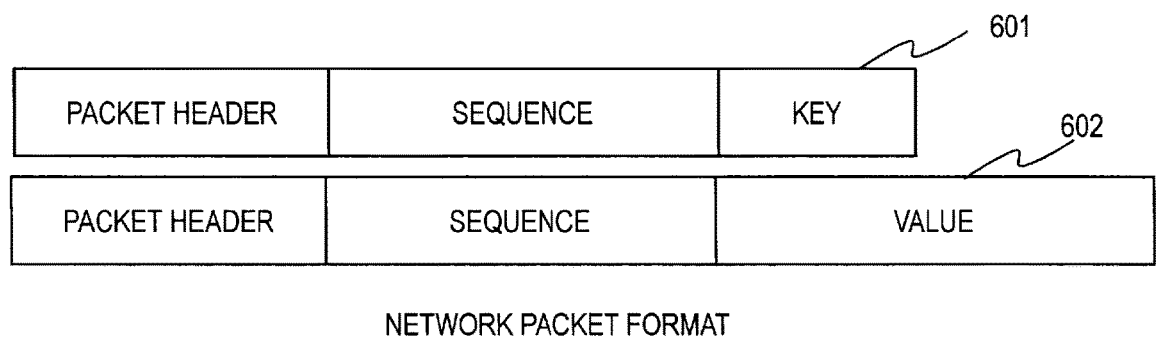
NETWORK PACKET FORMAT

[Fig. 7]
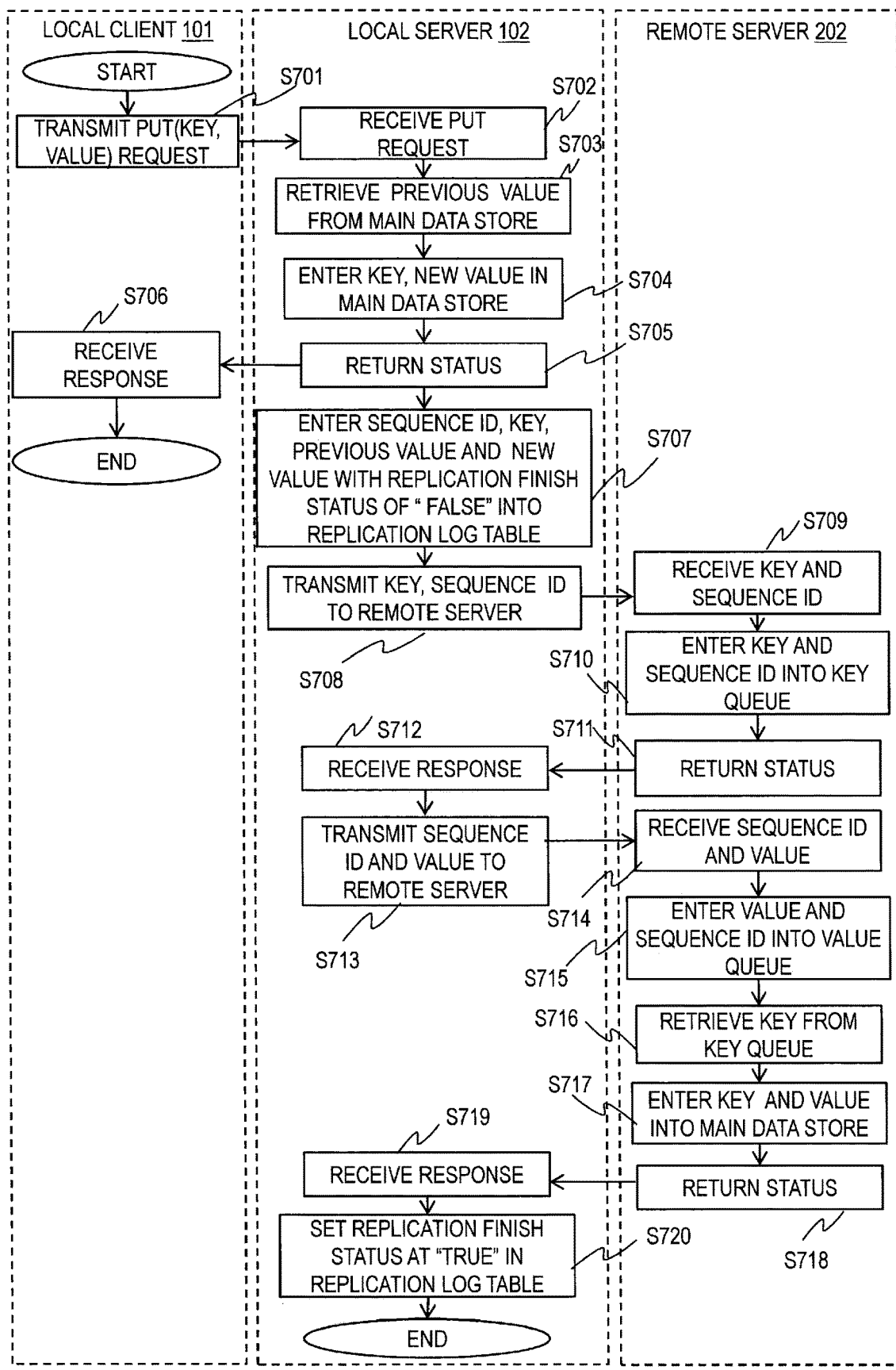

[Fig. 8]
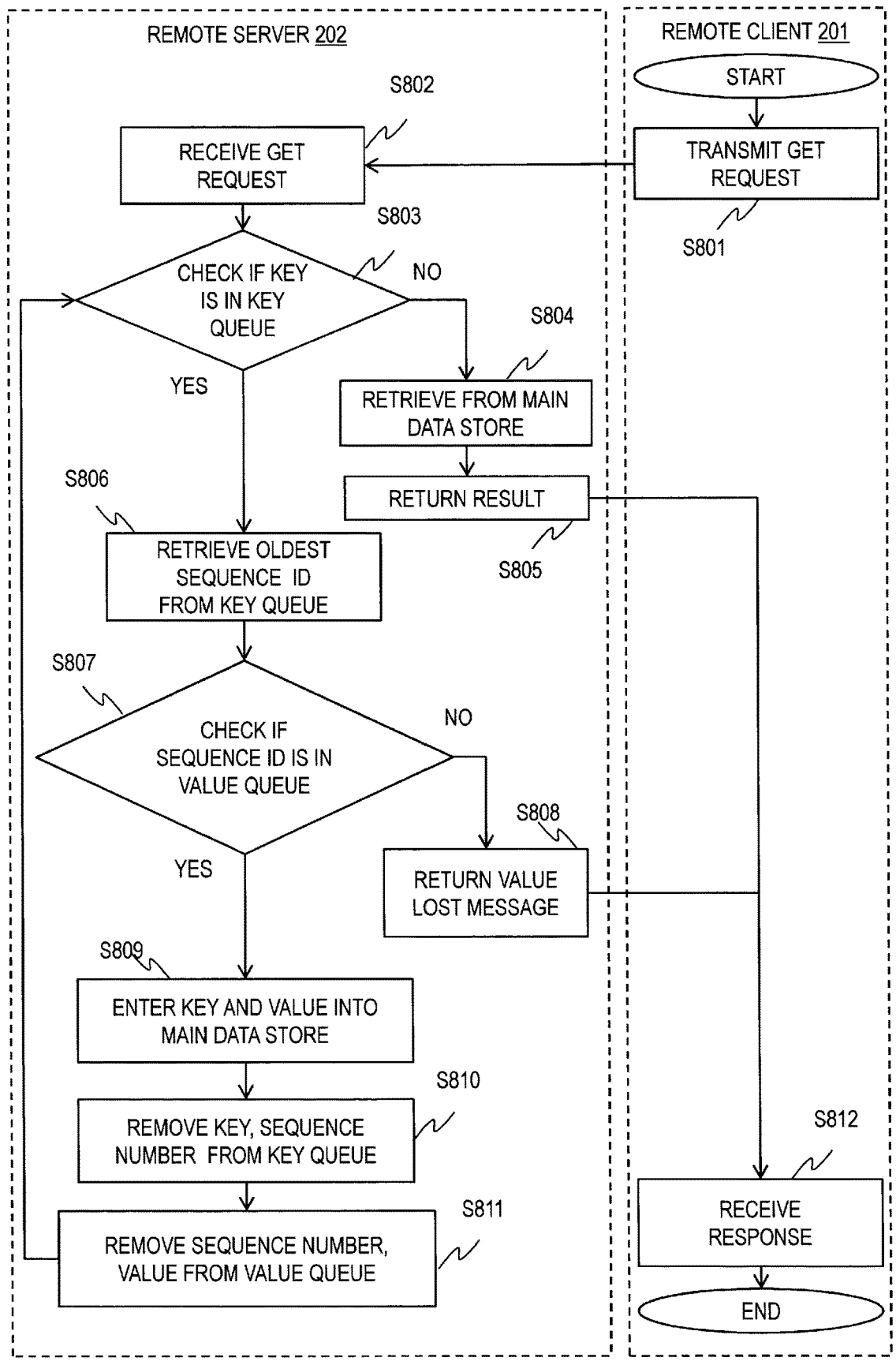

[Fig. 9]
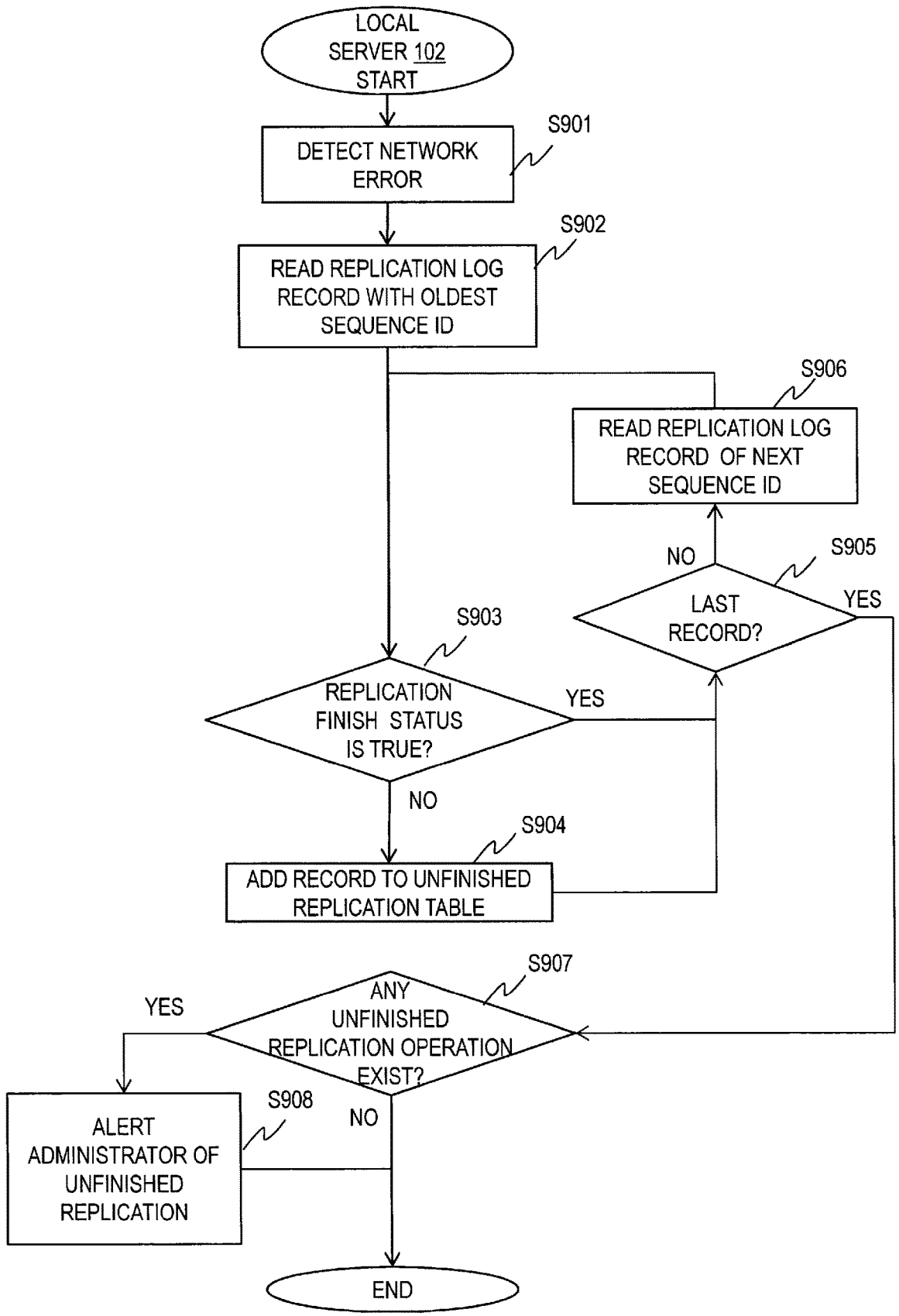

[Fig. 10]
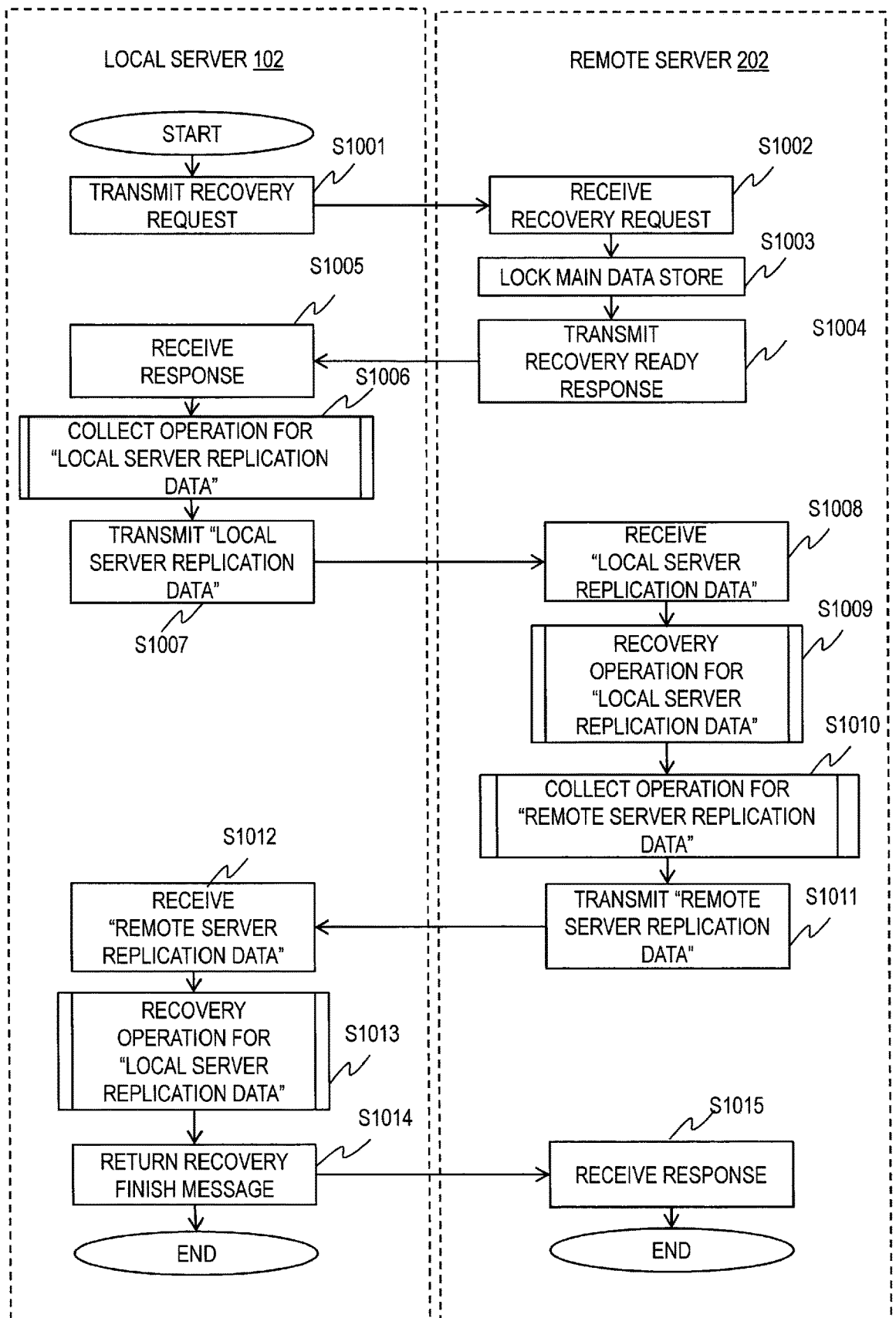

[Fig. 11]
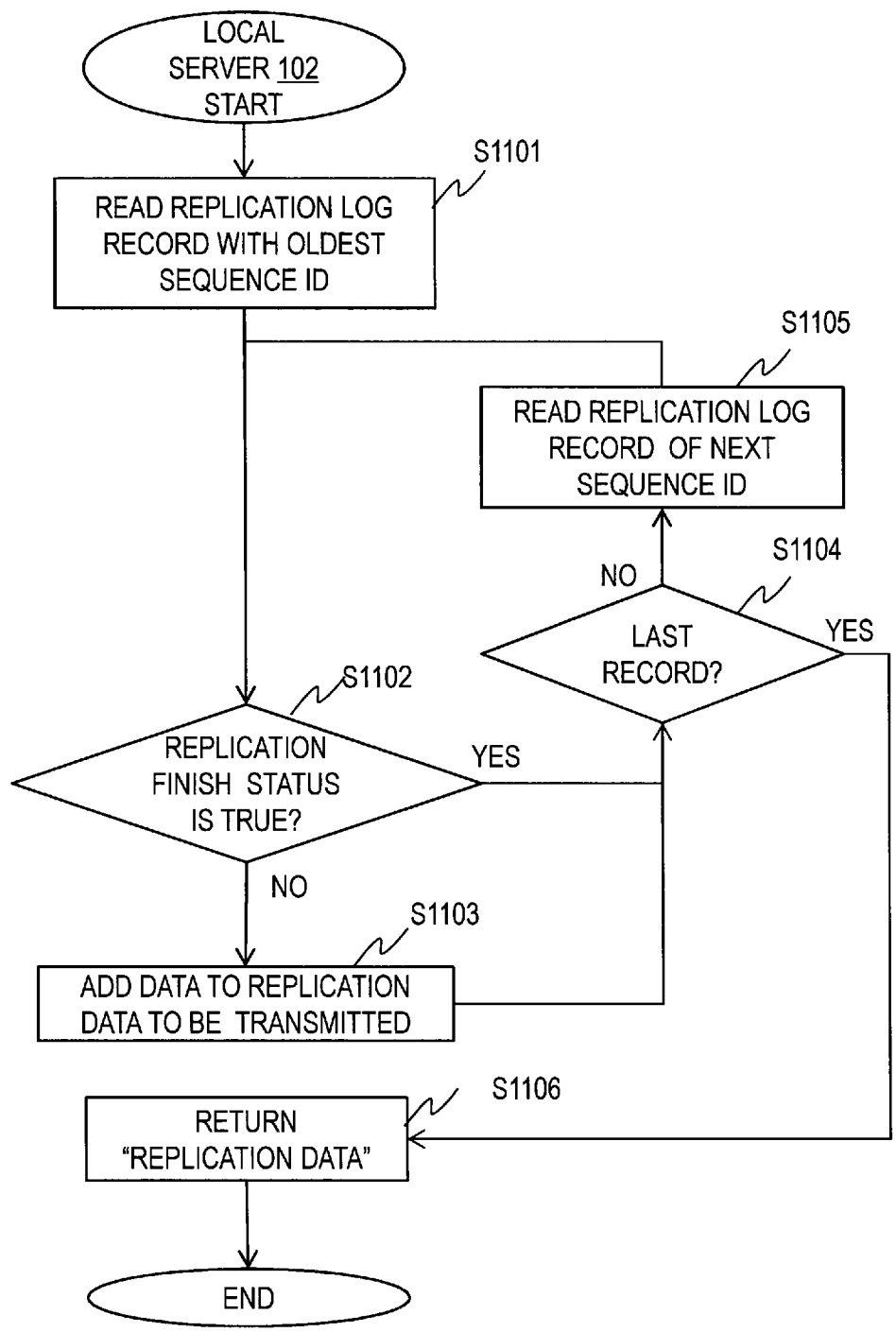

[Fig. 12]

| SEQUENCE NUMBER | KEY | PREVIOUS VALUE | NEW VALUE | REPLICATION FINISH STATUS |
|---|---|---|---|---|
| SEQ11 | KEY11 | VALUE 110 | VALUE 111 | FALSE |
| SEQ12 | KEY12 | VALUE 120 | VALUE 121 | FALSE |
| SEQ13 | KEY13 | NULL | VALUE 130 | FALSE |
| ⋮ | ⋮ | ⋮ | ⋮ | ⋮ |

REPLICATION DATA FOR RECOVERY

[Fig. 13]
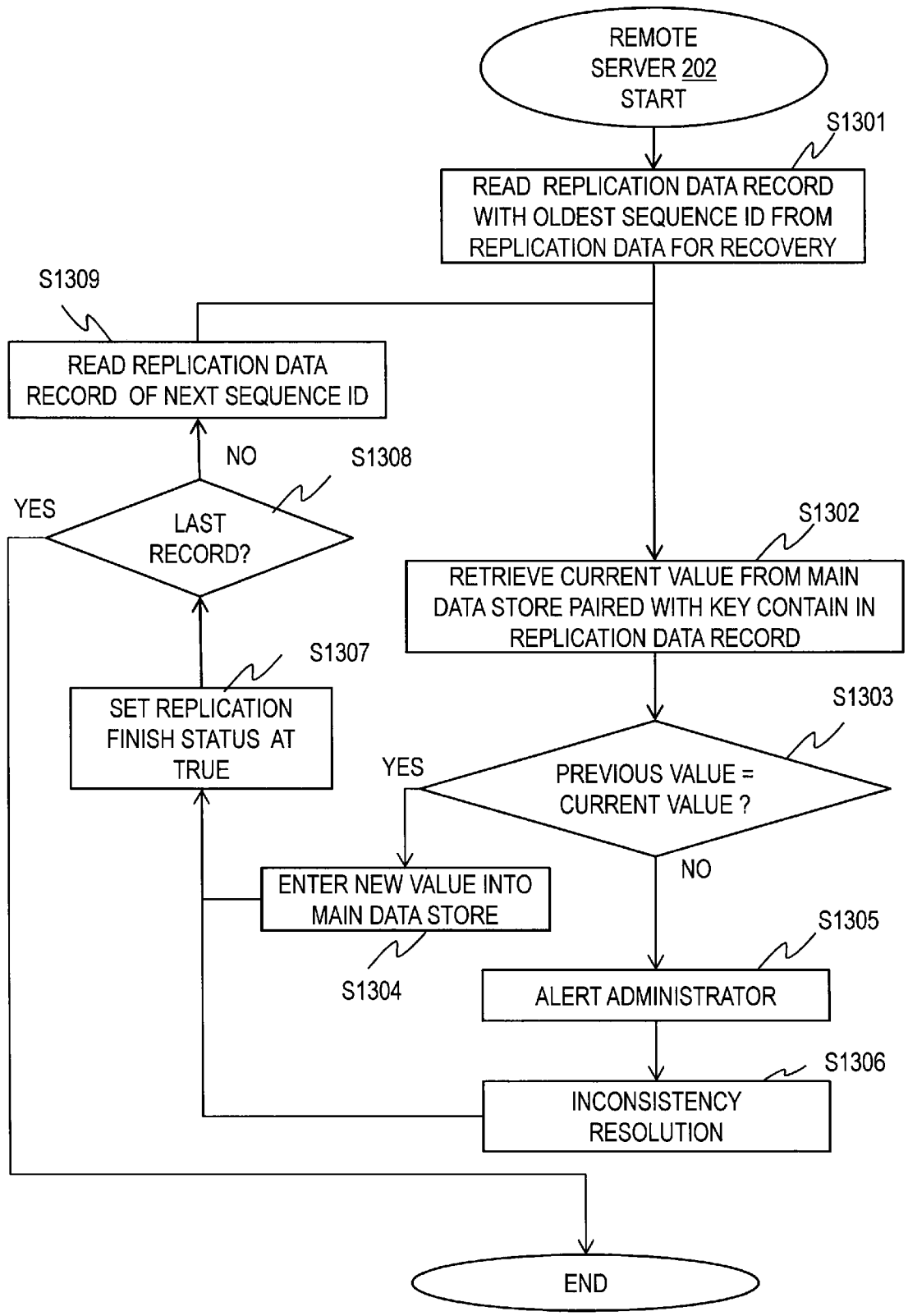

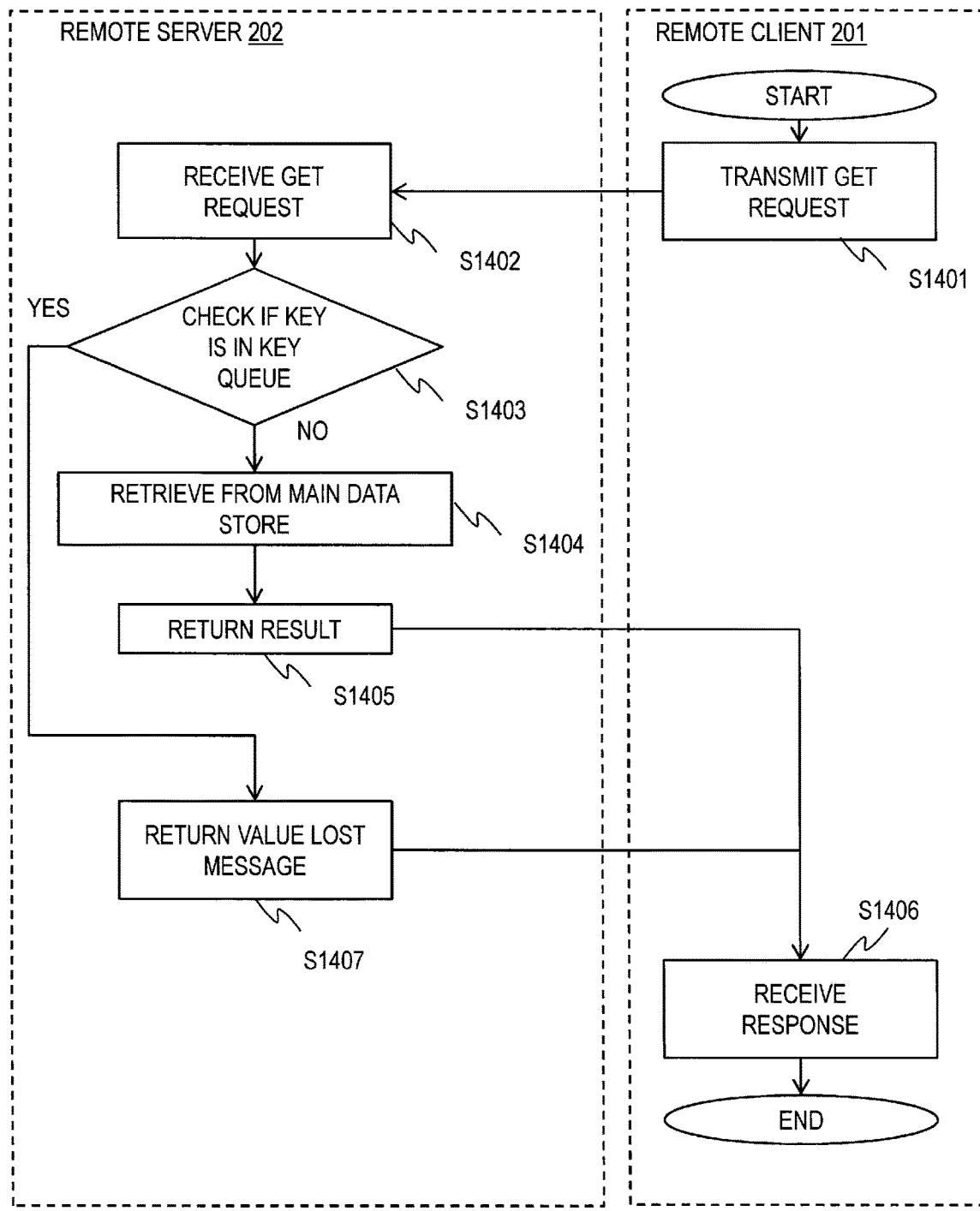
[Fig. 14]

ical example allows an information process-
INFORMATION PROCESSING SYSTEM

BACKGROUND ART

Long distance data synchronization is utilized for failover in the case of disaster (e.g. earthquake) and for other purposes. A low-latency data store (e.g. In-Memory KVS) is utilized to provide a fast response data store in a crucial business application. For long-distance data synchronization for a low latency data store, the whole system is configured to include two systems. One is a local system which serves at least one local client, and the other is a remote system which serves at least one remote client.

US2013/0117223 A1 discloses an information processing system including first to third storage systems. The first storage system performs stubbing by managing entity data of a file in the second storage apparatus, migration by replicating the data of the file to the second storage apparatus, and recall by writing the entity data of the file from the second storage apparatus 10b back to the first storage apparatus. Moreover, the second storage system performs remote copy by replicating metadata of the migrated file from the first storage apparatus to the third storage apparatus at timing of the migration (synchronously), and replicating the entity data of the file to the third storage apparatus at timing independent of the timing of the migration (asynchronously).

CITATION LIST

Patent Literature

PTL 1: US2013/0117223 A

SUMMARY

In the event of disaster, failover occurs from a local system to a remote system. US2013/0117223 A1 configures a local system to perform remote copy by first replicating the metadata to a remote system. When a remote client tries to process data which comes from the local system, the remote system checks the hash value of the current data. In high write frequency applications, utilizing a hash value to check consistency requires perfect network condition in high write frequency conditions, because if network packets arrive out of order to the remote site, the remote system could not understand the correct order by only observing hash values, which causes inconsistency.

A representative example is an information processing system including: a first system; and a second system, wherein the first system is configured to receive values with identifiers of the values from one or more clients, wherein the first system is configured to enter the values sequentially into a first data store, wherein the first system is configured to associate each of the values with a sequence ID indicating a position in entry sequence of the values into the first data store, wherein the first system is configured to transmit a first identifier of a first value and a first sequence ID associated with the first value to the second system, wherein the first system is configured to transmit the first sequence ID and the first value to the second system after transmitting the first identifier and the first sequence ID, wherein the second system is configured to hold the first identifier and the first sequence ID transmitted from the first system in a first queue, and wherein the second system is configured to enter the first value received after the first identifier from the first system into a second data store.

A representative example allows an information processing system to prevent data inconsistency between the remote data stores.

BRIEF DESCRIPTION OF DRAWINGS

FIG. 1 depicts the overall configuration of an information processing system involved in long-distance synchronization.

FIG. 2 depicts a hardware configuration example of the local client and the remote client.

FIG. 3 depicts a hardware configuration example of the local server apparatus and the remote server apparatus.

FIG. 4A depicts an exemplary format of the key queues stored in the local server and the remote server, respectively.

FIG. 4B depicts an exemplary format of the value queues stored in the local server and the remote server, respectively.

FIG. 4C depicts an exemplary format of the main data stores stored in the local server and the remote server, respectively.

FIG. 5 depicts an exemplary format of replication log tables stored in the local server and the remote server, respectively.

FIG. 6 depicts exemplary replication data transmitted between the local server and the remote server.

FIG. 7 depicts a flowchart for handling a write request from the application 1 to the local server.

FIG. 8 depicts a flowchart of handling a read request from the application in the case of failure in the local server due to disaster.

FIG. 9 depicts a flowchart of processing by the local server in the case where the replication manager is unable to send replication data to the remote server due to disaster.

FIG. 10 depicts a flowchart of resynchronization between the local server and the remote server after recovery, and resumption of operation in the local server.

FIG. 11 depicts a flowchart of the collection operation utilized in the steps S1006 and S1010.

FIG. 12 depicts an exemplary format of the replication data for recovery.

FIG. 13 depicts a flowchart of the recovery operation utilized in the steps S1009 and S1013.

FIG. 14 depicts a flowchart of handling a read request from the application using the value-sequence ID packet containing a key in addition to a value and a sequence ID in the case of failure in the local server due to disaster.

DESCRIPTION OF EMBODIMENTS

Hereinafter, embodiments are described with reference to the accompanying drawings. It should be noted that the embodiments are merely examples to implement the invention and are not to limit the technical scope of this invention. Throughout the drawings, common elements are denoted by the same reference signs.

An embodiment relates to a method for performing data synchronization across long distance, and specifically, long distance replication for low-latency distributed data store. In addition to consistency protection, a long-distance replication method in low-latency data stores is also required to perform replication while maintaining fast response capability. An embodiment provides a technique which enables long-distance data replication and also is capable of maintaining both consistencies and fast response capability, even with unpredictable network condition.

The identifier of a value (data) and the associated sequence ID are transmitted to a remote system from a local system. An example of a pair of an identifier and a value is a key-value pair of a key-value data store. Another type of a value and an identifier may be utilized. For example, a file (value) and a file name (identifier) may be used.

The value and the sequence ID are transmitted at a time independent of the prior transmission of the identifier and the same sequence ID from the local system to the remote system. The remote system enters the sequence ID and the identifier into a queue. The remote system searches the queue for the sequence ID transmitted with the value and, and enters the value into a main data store when the sequence ID and the associated identifier is found in the queue.

When failover occurs from the local system to the remote system, the remote system receives a request with an identifier from a remote client and searches the queue for the identifier. If the matching identifier is found in the queue and the value associated with the same sequence ID as the identifier is not received from the local system, an error is detected and an error message is issued. Specifically, the remote system creates and returns an error message to the remote client to protect data consistency.

As described above, the embodiment transmits an identifier before a value for remote replication, allowing a low latency operation (quick response capability) in the remote replication. The embodiment uses a sequence ID during the remote replication for checking the replication status, allowing protection of data consistency.

Hereinafter, embodiments are explained more specifically with reference to the drawings. FIG. 1 depicts the overall configuration of an information processing system involved in long-distance synchronization. An example of the information processing system is a reservation system for tickets. The information processing system includes a local client apparatus 101, a local server apparatus 102, a remote client apparatus 201 and a remote server apparatus 201.

The local client apparatus 101 is connected with the local server apparatus 102 through a local site network 11. The remote client apparatus 201 is connected with the remote server apparatus 202 through a remote site network 22. The Local server apparatus 102 is connected with the remote server apparatus 202 through an inter-site network 33. For example, the local site network 11, the remote site network 22 and the inter-site network 33 may utilize multiple wired connection (such as copper and fiber channel) and/or wireless connection (such as cellular and WLAN).

An application (program) 1 runs on a user terminal (not shown). Applications may run on the local client apparatus 101 and on the local client apparatus 201. One local client apparatus executing an application may be connected with both of the local server apparatus 102 and the remote server apparatus 202.

The application 1 reads data from and writes data to the local server apparatus 102 by sending a read (get) request and a write (put) request through local client apparatus 101, respectively. The application 1 reads data from and writes data to the remote server apparatus 202 by sending a read (get) request and a write (put) request through remote client 201, respectively.

For example, the application 1 selects a request destination server based on the data to be read or written. A key-value pair is only accessed at a single site (server apparatus) and no key-value pair is accessed simultaneously at the both locations. As described below, unless failover following a disaster or the completion of recovery operation occurs, the access location for a key-value pair does not change.

The local client apparatus 101 includes a request manager (program) 1022. The remote client apparatus 201 includes a request manager (program) 2012. The request manager 1012 forwards requests received from the application 1 to the local server apparatus 102. The request manager 2012 forwards requests received from the application 1 to the local server apparatus 202.

The local server apparatus 102 includes a control program group 1021 and a management table group 1026. The control program group 1021 includes control programs. Specifically, the control program group 1021 includes the request manager 1022, a replication transmitter 1023, a replication receiver 1024, and a replication manager 1025.

The management table group 1026 includes management tables. Specifically, the management table group 1026 includes a main data store 1027, a key queue 1028, a value queue 1029 and replication log table 1030.

The request manager 1022, in response to a request from the local client apparatus 101, reads data from or writes data to the main data store 1027. The replication transmitter 1023 transmits replication data to the remote server apparatus 202. The replication receiver 1024 receives replication data from the remote server apparatus 202.

The replication manager 1025 manages replication from the remote server apparatus 202 by observing the key queue 1028 and the value queue 1029, and enters matching key-value pairs into main data store 1027.

The main data store 1027 contains keys and their corresponding values (key-value pairs). A key is a unique identifier in the main data store 1027 which points to a corresponding value and the key-value pair (a record in the table). A value is a string of bytes utilized by the application 1.

The key queue 1028 is a queue with a table structure for storing pairs of a key and a sequence ID from the remote server apparatus 202. Each pair consists of a sequence ID and a key associated with the sequence ID.

The value queue 1029 is a queue with a table structure for storing pairs of a sequence ID and a value from the remote server apparatus 202. Each pair consists of a sequence ID and a value associated with the sequence ID. As described later, a sequence ID is assigned to a key-value pair, and the sequence ID is associated with the key and the value of the key-value pair.

The local server apparatus 202 includes a control program group 2021 and a management table group 2026. The control program group 2021 includes control programs. Specifically, the control program group 2021 includes the request manager 2022, a replication transmitter 2023, a replication receiver 2024, and a replication manager 2025.

The management table group 2026 includes management tables. Specifically, the management table group 2026 includes a main data store 2027, a key queue 2028, a value queue 2029 and replication log table 2030.

The request manager 2022, in response to a request from the remote client 201, reads data from or writes data to the main data store 2027. The replication transmitter 2023 transmits replication data to the local server apparatus 102. The replication receiver 2024 receives replication data from the local server apparatus 102.

The replication manager 2025 manages replication from the local server apparatus 102 by observing the key queue 2028 and the value queue 2029, and enters matching key-value pairs into main data store 2027.

The main data store 2027 constitutes a replication pair with the main data store 1027. The main data store 2027 contains keys and their corresponding values (key-value pairs). A key is a unique identifier in the main data store 2027 which points to a value and the key-value pair (a record in the table). A value is a string of bytes utilized by an application.

The key queue 2028 is a queue with a table structure for storing pairs of keys and sequence IDs from the local server apparatus 102. Each pair consists of a sequence ID and a key associated with the sequence ID.

The value queue 2029 is a queue with a table structure for storing pairs of sequence IDs and values from the local server apparatus 102. Each pair consists of a sequence ID and a value associated with the sequence ID. A sequence ID is assigned to a key-value pair, and the sequence ID is associated with the key and the value of the key-value pair.

The key queue is a storage area used for holding the keys and the sequence IDs temporarily. The order of addition of records may not be the same as the order of removal of the records. The value queue is a storage area used for holding the values and the sequence IDs temporarily. The order of addition of records may not be the same as the order of removal of the records.

A key-value store is an exemplary store type of the main data store. A key-value store achieves high scalability, high availability and high-speed response with a simple configuration.

FIG. 2 depicts a hardware configuration example of the local client apparatus 101 and the remote client 201. The client apparatus 2000 includes a processor 2001, a main memory device 2002, a persistent storage 2003 (such as a hard disk drive and a solid state drive), a network interface 2004 (such as a LAN adapter and a Fiber Channel Adapter), an input device 2005 (such as a keyboard and a mouse) and an output device 2006 (such as a monitor and a printer). The client apparatus 2000 executes an operating system (including a file system, a kernel and a driver) and a request manager.

FIG. 3 depicts a hardware configuration example of the local server apparatus 102 and the remote server apparatus 202. The server apparatus 3000 includes a processor 3001, a main memory device 3002, a persistent storage 3003 (such as a hard disk drive and a solid state drive), a network interface 3004 (such as a LAN adapter and a Fiber Channel Adapter), an input device 3005 (such as a keyboard and a mouse) and an output device 3006 (such as a monitor and a printer).

The server apparatus 3000 executes an operating system (including a file system, a kernel and a driver) and the control program group (including the request manager, the replication transmitter, the replication receiver, and the replication manager).

The server apparatus 3000 stores the management table group in the main memory device 3002 and the persistent storage 3003. In an example, the tables other than the replication log table are stored only in the main memory device 3002 and the replication log table is stored only in the persistent storage 3003. The replication log table may be cached in the main memory device 3002. All the tables may be stored in the persistent storage 3003 and cached in the main memory device 3002.

The processor 3001 acts as specific functional parts by operating in accordance with programs stored in the memory 2002 in corporation with other devices. Thus, a description having a subject of program in this disclosure may be replaced by a description having a subject of processor or apparatus with the processor. Typically, programs and data are loaded from the persistent storage 3003 or downloaded from an external apparatus through the network interface 3004 to the memory 3002. The same applies to the client apparatus 2000.

FIG. 4A depicts an exemplary format of the key queues 1028 and 2028 stored in the local server apparatus 102 and the remote server apparatus 202, respectively. The key queue 1028/2028 (each of the key queues 1028 and 2028) contains sequence IDs and corresponding unique keys. As described above, the key queue 1028/2028 stores keys transmitted together with the corresponding sequence IDs from the other server.

The sequence ID indicates the order of entry by the request manager into the main data store. For example, the sequence ID indicates the time when the data (key-value pair) is stored into the main data store or the data is received from the application. The sequence ID may indicate the place where entry is registered in the main data store 1027/2027.

The sequence ID may utilize any type of numerical value capable of determining the order of key-value pairs in both of the local server apparatus 102 and the remote server apparatus 202. The sequence ID may be created by replication manager 1025/2025 for synchronization purpose based on notice from the request manager 1022/2022 of a new key-value pair entry in the main data store 1027/2027.

For example, a sequence ID in the key queue 2028 of the remote server apparatus 202 shows that the corresponding value is a key and the key (key-value pair) is entered into the main data store 1027 (or received from the application 1) at 20:00 at the local server apparatus 102. In the key queue 410, multiple sequence IDs may point to the same key because multiple operations can be performed on a single key.

FIG. 4B depicts an exemplary format of the value queues 1029 and 2029 stored in the local server apparatus 102 and the remote server apparatus 202, respectively. The value queue 1029/2029 contains sequence IDs and the corresponding values (value parts of key-value pairs). As described above, the value queue 1029/2029 stores values transmitted together with the corresponding sequence IDs from the other server. In the value queue 1029/2029, a single sequence ID may be associated with a single value. A key and a value associated with the same sequence ID constitute a key-value pair.

FIG. 4C depicts an exemplary format of the main data stores 1027 and 2027 in the local server apparatus 102 and the remote server apparatus 202, respectively. The main data store 1027/2027 is a so-called key-value store and contains keys and the corresponding values to be paired. Namely, the main data store 1027/2027 stores key-value pairs transmitted from the application and the other server. In the main data store 1027/2027, a key is unique and associated a single value at a given time. The main data store 1027/2027 may have another data store structure different from key-value store.

FIG. 5 depicts an exemplary format of replication log tables 1030 and 2030 stored in the local server apparatus 102 and the remote server apparatus 202, respectively. The replication log table 1030/2030 contains the information of the modification history (logs) and the replication status of the key-value pairs of the main data store 1027/2027 in the same server. The replication manager 1025/2025 writes records into the replication log table 100/2030 in response to request from the client apparatus 101/201 and maintains the replication log table 1030/2030 to keep the track of changes in the main data store 1027/2027.

In the replication log table 1030/2030, each record is configured to include a sequence ID, a key, a previous value, a new value, and a replication finish status in association with each other.

Each record indicates one time of update (modification) of a key-value pair in the main data store in accordance with a request from the client apparatus. Each record corresponds to one time of put operation identified by the sequence ID.

The previous value in the record is the value before modification by the put (write) operation. The new value in the record is the value after modification by the put operation. The replication finish status indicates whether the operation has been replicated correctly to the other server apparatus.

FIG. 6 depicts exemplary replication data transmitted between the local server apparatus 102 and the remote server apparatus 202. A packet 601 is a key-sequence ID packet for transmitting a key and the corresponding (assigned) sequence ID. The key and the sequence ID are stored in the key queue 1028/2028 at the receiver server apparatus 102/202.

A packet 602 is a value-sequence ID packet for transmitting a value (value part of a key-value pair) and the corresponding (assigned) sequence ID. The value and the sequence ID are stored in the value queue 1029/2029 at the receiver server apparatus 102/202. The packets 601 and 602 contain necessary networking header information to reach the target location.

FIG. 7 depicts a flowchart for handling a put (write) request from the application 1 to the local server apparatus 102. The local server apparatus 201 and the remote server apparatus 202 are operating normally. The write operation starts with a put request with a new key-value pair from the request manager 1012 in the local client apparatus 101 to the local server apparatus 102 (S701). The request manager 1022 in the local server apparatus 102 receives the put request (S702).

The request manager 1022 obtains the previous value before modification associated with the received key from the main data store 1027 (S703). Specifically, the request manager 1022 searches the main data store 1027 for the received key, and retrieves the value paired with the key from the main data store 1027. When the key is not stored in the main data store 107, the previous data is null.

The request manager 1022 enters the received key-value pair into the main data store 1027 (S704). Specifically, the request manager 1022 modifies the previous value paired with the key to the received new value. Note that the modification of the value in the main data store 1027 can be prohibited based on the value in some cases.

The request manager 1022 returns the put request result to the local client apparatus 101 (S705). The request manager 1012 in the local client apparatus 101 receives the response from the local server apparatus 102 and finishes the operation (S706).

Meanwhile, the request manager 1022 in the local server apparatus 102 adds the record of the sequence ID, the key, the previous value, the new value and the "false" replication finish status to the replication log table 1030, and notifies replication manager 1025 of new key-value pair entry (S707).

The replication manager 1025 creates the sequence ID from the entry time of the key-value pair into the main data store 1027 after request manager 1022 gives a notice of new entry, for example. The replication manager 1025 may create the sequence ID from the reception time from the local client 102, for example.

The replication manager 1025 in the local server apparatus 102 transmits the received key and the corresponding sequence ID to the remote server apparatus 202 (S708). The replication manager 1025 uses the replication transmitter 1023 to transmit the key-sequence ID packet 601 containing the key and the sequence ID to the replication receiver 2024 in the remote server apparatus 202.

The receiver 2024 in the remote server apparatus 202 receives the key-sequence ID packet 601 (S709). The replication manager 2025 enters the key and the sequence ID in the received packet 601 into the key queue 2028 (S710). The replication manager 2025 uses the replication transmitter 2023 in the remote server apparatus 202 to transmit a response back to the replication receiver 1024 in local server apparatus 102 (S711).

The replication receiver 1024 receives the response from remote server apparatus 202 (S712). The replication manager 1025 uses the replication transmitter 1023 to transmit a value-sequence ID packet 602 including the sequence ID and the value to the remote server apparatus 202 (S713).

The replication receiver 2024 receives the value-sequence ID packet 602 (S714). The replication manager 2025 enters the received sequence ID and value in the value-sequence ID packet 602 into the value queue 2029 (S715).

The replication manager 2025 searches the key queue 2028 for the sequence ID stored in the value queue 2029 (S715). The replication manager 2025 retrieves the key associated with the matching sequence ID from the key queue 2028 (S716). The replication manager 2025 enters the key-value pair into main data store 2027 in remote server apparatus 202 (S717). The replication manager 2025 deletes the key and the sequence ID from the key queue 2028, and the value and the sequence ID from the value queue 2029.

In an example, the replication manager 2025 enters key-value pairs into the main data store 2027 in the order of the sequence ID. When the value queue 2029 contains a plurality of records, the replication manager 2025 selects the record with the oldest sequence ID from the value queue 2029 to search the key queue 2028 for the key.

The replication manager 2025 uses the replication transmitter 2023 to transmit a response to the local server apparatus 102 (S718). The replication receiver 1024 in the local server apparatus 102 receives the response from the remote server apparatus 202 (S719). Finally, the replication manager 1025 sets the replication finish status at "true" in the replication log table 1030 (S720), and the process finishes for the put request from local client apparatus 101.

As described above, transmitting the key before the value allows quick notification of the value modification between server apparatuses. The application 1 can continue the processing after the step S706. As an alternative implementation, the step S705 may be performed after the step S712 to ensure error detection capability by not responding to the local client 101 until the key and the sequence ID reach the remote server 202, or the step S719 to ensure complete failover capability by not responding to the local client 101 until the value reaches remote server 202. The same flow may apply to a put request from the remote client apparatus 201 to the remote server apparatus 202.

In the case of large-scale disaster (e.g. earthquake), network infrastructure in the local site including the local client apparatus 101 and the local server apparatus 102 becomes unavailable. Therefore, the access to key-value pairs in the local server apparatus 102 from the local client apparatus 101 becomes unavailable.

In this case, the information processing system fails over to the remote system, and the functions of the local server apparatus 201 for the application are assumed by the remote server apparatus 202. Thus, the access to the local server apparatus 102 for key-value pairs via the local client apparatus 101 is switched to the remote server apparatus 202 via the remote client 201. Get and put operations are performed only on the remote server apparatus 202 while the local server apparatus 102 is unavailable.

FIG. 8 depicts a flowchart of handling a get (read) request from the application 1 in the case of failure in the local server apparatus 102 due to disaster. The application 1 detects the occurrence of failure regarding the local server apparatus 102, for example by request time-out. For example, the remote server apparatus 202 notified of the failure regarding the local server apparatus 102 from the application or recognize the failure by detecting the communication error with the local server apparatus 102.

The failover takes place, and the application 1 switches the access destination from the local server apparatus 102 to the remote server apparatus 202 for key-value pairs to be originally handled by the local server apparatus 102.

The application 1 transmits a get (read) request for a specific key to the remote server apparatus 202 via the remote client 201. The request manager 2012 in the remote client 201 transmits the get request to the remote server apparatus 202 (S801).

The request manager 2022 in the remote server apparatus 202 receives the get request for a specific key (S802). The request manager 2022 checks if the requested key by the application 1 is contained in the key queue 2027 (S803). If the requested key by the application 1 is not contained in the key queue 2027 (S803: NO), the request manager 2022 retrieves the value paired with the key indicated by the get request from the main data store 2027 (S804) and returns the result to the remote client 201 (S805). The remote client 201 receives the result (S812).

If the requested key by application 1 is contained in key queue 2028 (S803: YES), the request manager 2022 retrieves the oldest sequence ID for the requested key from the key queue 2028 (S806). Then, the request manager 2022 checks if the value queue 2029 contains the same sequence ID (S807). If the value queue 2029 does not contain the same sequence ID, a value error is detected and the request manager 2022 returns a value lost message (error message) to the remote client 201 (S808).

If the value queue 2029 contains the same sequence ID, the request manager 2022 obtains the value associated with the same sequence ID from the value queue 2029 and enters the key-value pair into the main data store 2027 (S809).

The request manager 2022 then deletes the oldest sequence ID and the associated key from the key queue 2028 (S810). The request manager 2022 deletes the same sequence ID and the associated value from the value queue 2029 (S811). The request manager 2022 then returns to the step S803.

The process described with reference to FIG. 8 prevents inconsistency of data between different sites (e.g. different values in the local and the remote sites for the same key). Prohibiting access to data whose replication has not been finished prevents two inconsistent values in different sites and maintains the consistency in the stored data in the two sever apparatuses 102 and 202. As described above, the requested value is entered into the main data store from the queue and retrieved from the main data store to be transmitted to the remote client apparatus. It allows the correct value to be retuned surely by simple process.

As an alternative implementation, the request manager 2022 may retrieves all the sequence IDs from the key queue 2028 for the requested key in the step S806, and performs the steps S807, S809, S810 and S811 serially without returning to the step S803. The request manager 2022 may search the key queue 2028 only for the key indicated by the get request.

The request manager 2022 may refer to the queues 2028 and 2029 in response to a put (write) request. When the requested key is contained in the key queue 2028 and the paired value is not contained in the value queue 2029, the request manager 2022 may return a value lost message to the remote client 201. When the paired value is contained in the value queue 2029, the request manager 2022 may enter the key-value pair into the main data store 2027 and enter the new the value received from the remote client 201.

FIG. 9 depicts a flowchart of processing by the local server apparatus 102 in the case where the replication manager 1025 is unable to transmit replication data to the remote server apparatus 202 due to disaster.

The replication manager 1025 detects a network error for the communication with the remote server apparatus 202 (S901). The replication manager 1025 reads the replication log record with the oldest sequence ID from the replication log table 1030 (S902). The replication manager 1025 checks the replication finish status of the record (S903).

If the replication finish status is "false" (S903: NO), the unfinished replication is detected. The replication manager 1025 adds the record into an unfinished replication table (not shown) (S904) and proceeds to a step S905.

If the replication finish status is "true" (S903: YES), the replication of the key-value pair of the record is finished, and no further operation is needed for the key-value pair. The replication manager 1025 proceeds to the step S905.

In the step S905, the replication manager 1025 determines whether the current record is the last record. If the current record is not the last record (S905: NO), the replication manager 1025 reads the record with next sequence ID (S906) and returns to the step S903.

If the current record is the last record (S905: YES), the replication manager 1025 checks the unfinished replication table (S907). If the unfinished replication table contains at least one record (S907: YES), the replication manager 1025 alerts an administrator of unfinished replication by sending (issuing) an error message to an administrator terminal (not shown) (S908). If the unfinished replication table contains no records (S907: NO), the process ends.

As described above, an error message is issued when a key-value pair whose replication is not finished is left in the failed site. Thus, inconsistent values in different sites are prevented.

FIG. 10 depicts a flowchart of resynchronization between the local server apparatus 102 and the remote server apparatus 202 in the recovery process, and resumption of the operation in the local server apparatus 102.

The replication manager 1025 in the local server apparatus 102 transmits a recovery request to the remote server apparatus 202 (S1001). The replication receiver 2024 in the remote server apparatus 202 receives the recovery request (S1002). The replication manager 2025 locks the main data store 2027, key queue 2028, and the value queue 2029 (S1003).

The replication manager 2025 in the remote server apparatus 202 then returns a recovery ready message to the local server apparatus 102 (S1004). The replication receiver 1024 in the local server apparatus 102 receives the message (S1005).

The replication manager 1025 refers to the replication log table 1030 and collects replication data to be transmitted to the remote server apparatus 202 (S1006). The method to perform the step S1006 is detailed in FIG. 11, while the format of replication data is detailed in FIG. 12.

The replication manager 1025 uses the replication transmitter 1023 to transmit the replication data to the remote server apparatus 202 (S1007). The replication receiver 2024 in the remote server apparatus 202 receives the replication data (S1008). The replication manager 2025 in the remote server apparatus 202 performs a recovery operation using the replication data (S1009). The step S1009 is detailed in FIG. 13.

The replication manager 2025 refers to the replication log table 2030 and collects replication data to be transmitted to the local server apparatus 102 (S1010). This step is the same as the operation detailed in FIG. 11, but performed by the remote server apparatus 202 instead. The replication manager 2025 uses the replication transmitter 2023 to transmit the replication data from the remote server apparatus 202 (S1011).

The replication receiver 1024 in the local server apparatus 102 receives the replication data (S1012). The replication manager 2025 performs a recovery operation using the replication data received by the replication receiver 1024 (S1013). The step is the same as the operation detailed in FIG. 13, but performed by the local server apparatus 102 instead.

Finally, the replication manager 1025 transmits a recovery finish message to the remote server apparatus 202 and concludes the operation (S1014). The replication receiver 2024 receives the response and also concludes the resynchronization operation (S1015).

Above described process with reference to FIG. 10 allows the local server apparatus 102 and the remote server apparatus 220 to resynchronize the main data stores 1027 and 2027 in the recovery process.

FIG. 11 depicts a flowchart of the collection operation utilized in the steps S1006 and S1010. The operation by the local server apparatus 102 in the step S1006 is explained with reference to FIG. 11; however, the same flow also applies to the remote server apparatus 202 in the step S1010.

The replication manager 1025 reads the replication log record with the oldest sequence ID from the replication log table 1030 (S1101). The replication manager 1025 checks the replication finish status of the record (S1102).

If the replication finish status is "false" (S1102: NO), then the unfinished replication is detected. The replication manager 1025 adds the record to replication data for recovery (S1103) and proceeds to a step S1104.

If the replication finish status is "true" (S1102: NO), then the replication of the key-value pair of the record is finished, and no further operation is needed for the key-value pair. The replication manager 1025 proceeds to step S1104.

In the step S1104, the replication manager 1025 determines whether the current record is the last record. If the current record is not the last record (S1104: NO), the replication manager 1025 reads the record of with next sequence ID (S1105) and returns to the step S1102.

If the current record is the last record (S1104: YES), the replication manager 1025 returns the replication data for recovery (S1106).

As described above, the replication log table managing the replication status of each pair allows the server apparatus to determine pairs to be replicated in the recovery process.

FIG. 12 depicts an exemplary format of the replication data for recovery. The unfinished replication data contains the sequence ID, the key, the previous value, the new value and the replication finish status of each record of the "false" replication finish status. In short, the replication data for recovery consist of the all records in the replication log table whose replication finish status is "false".

FIG. 13 depicts a flowchart of the recovery operation utilized in the steps S1009 and S1013. The operation by the remote server apparatus 202 in the step S1009 is explained with reference to FIG. 13; however, the same flow also applies to the local server apparatus 102 in the step S1013.

The replication manager 2025 reads the replication data record with the oldest sequence ID from the replication data for recovery whose format is illustrated in FIG. 12 (S1301).

The replication manager 2025 retrieves the current value paired with the key contained in the current replication data record from the main data store 2027 (S1302).

The replication manager 2025 compares the current value retrieved from the main data store 2027 and the previous value contained in the current replication data record (S1303). If the values are equal (the same values), then no inconsistency exists, and the replication manager 2025 enters the new value and the key contained in the current replication data record into the main data store 2027 (S1304).

If the values are different, then inconsistency exists, and the replication manager 2025 transmits an error message (alert) to the administrator terminal (S1305). The error message presents the key, the current value in the main data store 2027, and the previous value and the new value in the replication data record. The error message prompts the administrator to choose which value should be applied as the correct value for the current key.

After the value was decided via automatic matching (S1304) or administrator manual override (S1306), the replication manager 2025 sets the replication finish status of the current key-value pair at "true" (S1307).

Then, the replication manager 1025 determines whether the current record is the last record (S1308). If the current record is not the last record (S1308: NO), the replication manager 1025 reads the record with next sequence ID (S1309) and returns to the step S1302. If the current record is the last record (S1308: YES), the process ends.

If the remote server apparatus 202 modifies the key-value pairs while the local server apparatus 102 is unavailable, the key-value pairs in local server apparatus 102 are not synchronized with the key-value pairs in the remote server apparatus 202. Specifically, the remote server apparatus 202 can modify key-value pairs to be originally handled (received from the application) by the local server apparatus 102 after failover from the local server apparatus 102. For instance, the remote server apparatus 202 can add new key-value pairs to be originally received from the application 1 by the local server apparatus 102. The remote server apparatus 202 can modify or delete the value of an existing key-value pair transmitted from the local server apparatus 102.

The above described process allows the server apparatuses to check the consistency between the data stores and solve the inconsistency between the data stores.

In an alternative implementation, the value-sequence ID packet 602 may contain a key in addition to a value and a sequence ID. In this case, the value queues 1029 and 2029 can be omitted. The replication manager 2025 can obtain the key-value pair from the value-sequence ID packet 602 and enters the key-value into the main data store 2027, and remove the matching key and the sequence ID from key queue 2028.

FIG. 14 depicts a flowchart of handling a read request from the application 1 using the value-sequence ID packet 602 containing a key in addition to a value and a sequence ID in the case of failure in the local server apparatus 102 due to disaster. Compared to FIG. 8, steps S1401 to S1406 correspond to the steps S801 to S805 and S812, respectively. When the requested key exists in the step S1403, the request manager 2022 returns a value lost message to the remote client 201 (S1407) without referring to the key queue 2028. As described above, the value queue 2029 does not exist.

In the above, the replication from the local server apparatus 102 to the remote server apparatus 202 is explained with reference to FIGS. 7 to 14. The system can perform the replication from the local server apparatus 102 to remote server apparatus 102 in the same way.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD, or a storage medium such as an IC card, or an SD card.

The drawings shows control lines and information lines as considered necessary for explanations but do not show all control lines or information lines in the products. It can be considered that almost of all components are actually interconnected.

The invention claimed is:

1. An information processing system comprising:
a first system comprising a first processor, a first memory storing a first program, and a first data store; and
a second system comprising a second processor, a second memory storing a second program, and a second data store,
wherein the first processor of the first system is configured to execute the first program to:
receive values with identifiers of the values from one or more clients;
enter the values sequentially into the first data store;
associate each of the values with a sequence ID indicating a position in entry sequence of the values into the first data store; and
transmit a first identifier of a first value and a first sequence ID associated with the first value to the second system,
wherein the second processor of the second system is configured to execute the second program to hold the first identifier and the first sequence ID received from the first system in a first queue,
wherein the first processor of the first system is configured to execute the first program to transmit the first sequence ID and the first value to the second system after transmitting the first identifier and the first sequence ID, and wherein the second processor of the second system is configured to execute the second program to:
hold the first value and the first sequence ID received from the first system in a second queue, the second queue configured to store values and associated sequence IDs received from the first system; and
enter the first value, received from the first system after the first identifier and held in the second queue, into the second data store when the first sequence ID held in the second queue is found in the first queue.

2. The information processing system according to claim 1, wherein, after failover from the first system to the second system, the second system is configured to issue an error message when (a) a second identifier of a second value and a second sequence ID associated with the second value are stored in the first queue and (b) the second value is not received from the first system with the second identifier.

3. The information processing system according to claim 1, wherein, in response to a request indicating a third identifier of a third value from the one or more clients, the second system is configured to search the first queue for the third identifier before searching the second data store for the third value.

4. The information processing system according to claim 1, wherein, in response to a request for a third value stored in the second queue, the second system is configured to enter the third value retrieved from the second queue into the second data store, and return the third value retrieved from the second data store.

5. The information processing system according to claim 1,
wherein the first system includes a replication management information indicating whether replication to the second system for each value is finished, and
wherein the first system is configured to issue an error message when the first system detects a network error for communication with the second system and the replication management information indicates that replication of a value to the second system is not finished.

6. The information processing system according to claim 1,
wherein the first system includes a replication management information indicating whether replication to the second system for each value is finished, and
wherein the first system is configured to transmit a new value the replication management information indicates replication of which is not finished with an identifier of the new value and a previous value identified by the identifier, in recovery process from failover,
wherein the second system is configured to:
compare the previous value and a value identified by the identifier in the second data store, and
issue, when the previous value and the value identified by the identifier in the second data store are different, an error message.

7. The information processing system according to claim 6,
wherein, when the previous value and the value identified by the identifier in the second data store are equal, the second system is configured to change the value identified by the identifier in the second data store to the new value.

8. A method for data replication in an information processing system including a first system including a first data store and a second system including a second data store, the method comprising:

receiving, by the first system, values with identifiers of the values from one or more clients;

entering, by the first system, the values sequentially into the first data store, associating, by the first system, each of the values with a sequence ID indicating a position in entry sequence of the values into the first data store;

transmitting, by the first system, a first identifier of a first value and a first sequence ID associated with the first value to the second system;

holding, by the second system, the first identifier and the first sequence ID transmitted from the first system in a first queue;

transmitting, by the first system, the first sequence ID and the first value to the second system after transmitting the first identifier and the first sequence ID;

holding, by the second system, the first value and the first sequence ID received from the first system in a second queue, the second queue configured to store values and associated sequence IDs received from the first system; and entering, by the second system, the first value, received from the first system after the first identifier and held in the second queue, into the second data store when the first sequence ID held in the second queue is found in the first queue.

9. The method according to claim 8, further comprising:
after failover from the first system to the second system, issuing, by the second system, an error message when (a) a second identifier of a second value and a second sequence ID associated with the second value are stored in the first queue and (b) the second value is not received from the first system with the second identifier.

10. The method according to claim 8, further comprising:
in response to a request indicating a third identifier of a third value from the one or more clients, searching, by the second system, the first queue for the third identifier before searching the second data store for the third value.

11. The method according to claim 8,
wherein the method further comprises:
in response to a request for a third value stored in the second queue, entering, by the second system, the third value retrieved from the second queue into the second data store, and returning the third value retrieved from the second data store.

12. The method according to claim 8,
wherein the first system includes a replication management information indicating whether replication to the second system for each value is finished, and
wherein the method further comprises:
issuing, by the first system, an error message when the first system detects a network error for communication with the second system and the replication management information indicates that replication of a value to the second system is not finished.

13. The method according to claim 8,
wherein the first system includes a replication management information indicating whether replication to the second system for each value is finished, and
wherein the method further comprises:
transmitting, by the first system, a new value the replication management information indicates replication of which is not finished, with an identifier of the new value and a previous value identified by the identifier, in recovery process from failover;
comparing, by the second system, the previous value and a value identified by the identifier in the second data store; and
issuing, by the second system, an error message when the previous value and the value identified by the identifier in the second data store are different.

14. The method according to claim 13, further comprising:
changing, by the second system, the value identified by the identifier in the second data store to the new value when the previous value and the value identified by the identifier in the second data store are equal.

* * * * *